(No Model.)
J. CLARK.
FIRE ESCAPE.
No. 379,934. Patented Mar. 27, 1888.
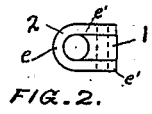
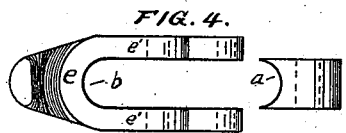
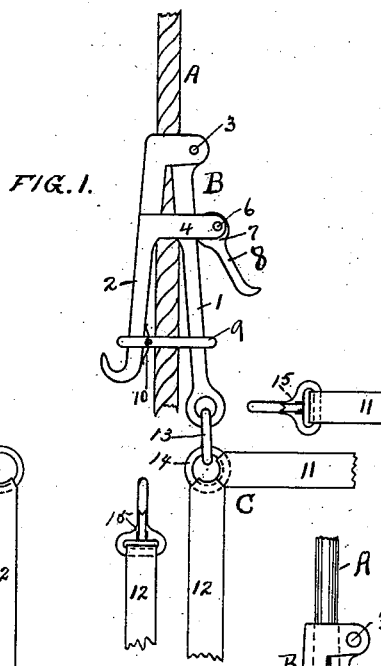
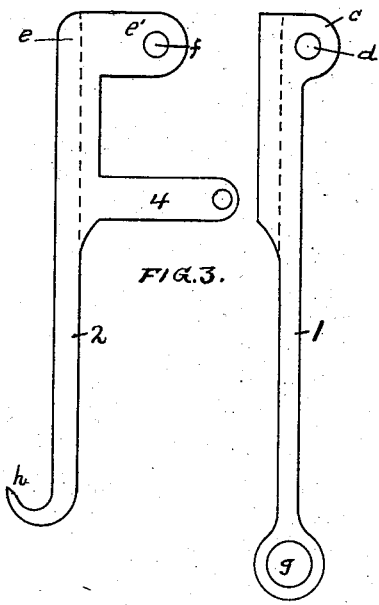
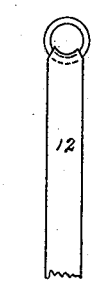
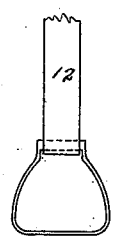
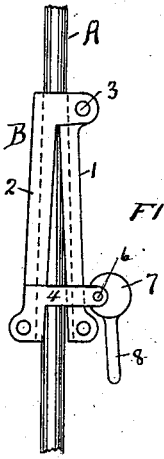
WITNESSES:
G. E. Tuttle
Emma F. Elmore
INVENTOR.
Joel Clark.
BY Jas. F. Williamson
ATTORNEY.

UNITED STATES PATENT OFFICE.

JOEL CLARK, OF MINNEAPOLIS, MINNESOTA.

FIRE-ESCAPE.

SPECIFICATION forming part of Letters Patent No. 379,934, dated March 27, 1888.

Application filed July 25, 1887. Serial No. 245,223. (No model.)

*To all whom it may concern:*

Be it known that I, JOEL CLARK, a citizen of the United States, and a resident of the city of Minneapolis, county of Hennepin, State of Minnesota, have invented a certain new and useful Fire-Escape, of which the following is a specification.

My invention has for its object to provide a portable friction fire escape which is adapted to be attached to any part of a building, and with which an individual may lower himself or others—even though helpless—with safety to the ground; and it consists of the construction hereinafter fully described and particularly claimed.

In the accompanying drawings, like letters referring to like parts, Figure 1 is a side elevation of my device in position for use. Fig. 2 is a plan of the clutch-head. Fig. 3 is a side elevation of the clamping-jaws detached. Fig. 4 is a plan view of the same, and Fig. 5 is a side elevation of a slightly-modified form of the device.

A is part of a rope or wire cable of sufficient length to reach from any part of the building wherein it is to be used to the ground. When the clutch is used as shown in the drawings, one end of this rope is made fast to the window-sill, or any other convenient part of the room from which the escape is to be made, and the other end is allowed to drop to the ground.

B is a clutch or friction device composed of the pair of clamping-jaws 1 and 2, provided each with concave interior faces, $a$ and $b$. The jaw 1 is provided with the outwardly-projecting head $c$, having the hole $d$, and the jaw 2 is provided with the bifurcated head $e$, through the arms of which, $e'$, passes the hole $f$. The arms of the head $e$ embrace the head $c$, and the two are pivotally connected by the pin 3. When so connected, the concave surfaces $a$ and $b$ face each other and form a groove of sufficient size to freely pass the cable A. These bearing or gripping surfaces $a$ and $b$ may be extended the whole length of the jaws, as shown in Fig. 5, or they may extend for only a few inches below the point of pivotal connection, as shown in Figs. 1 and 3. The lower end of the jaw 1 is provided with an eye, $g$, and the lower end of the jaw 2 is preferably turned upward and outward into hook form, as shown at $h$. Integral with the jaw 2 is cast a strong keeper, 4, which is made large enough to embrace and allow a limited outward movement to the jaw 1. Mounted eccentrically in this keeper by the pin 6 is the locking-cam 7, provided with a lever-handle, 8, which cam is adapted to bear against the freely-moving jaw 1 and clamp the two tightly on the cable A whenever so desired. A loose link, 9, embraces the two jaws and is movable thereon, which is of a proper size to allow the jaws to open far enough to work freely on the cable when in its positions near their connected ends, and to lock the jaws tightly together when in position near their free ends. This locking-link is held from sliding down by gravity when not so wanted and interfering with the proper working of the clutch by a friction-spring, 10, attached to the same and bearing against one of the jaws.

C is a device for securely fastening the descending person to the clutch. It consists of a pair or system of straps, 11 and 12, &c., attached to a common link or ring, 14, at one end, and provided with snap-hooks or buckles 15 at the other; or one of them, as 12, may be provided with a foot-stirrup at its free end. The ring 14 is connected directly through another ring or link, 13, with the lower end of the jaw 1. The strap 11 is adapted to pass around the chest directly under the arms, and the strap 12 to go under the central part of the body, or, in case a stirrup is used, to engage one or both feet.

The operation is clear from the description already given. The cable being made fast above, the escaping person attaches himself by the straps 11 and 12 and grasps the jaws 1 and 2 with one hand and the cam-handle 8 with the other. By pulling downward on the jaw 2 against his own weight suspended on the jaw 1 he can produce all the friction likely to be required to give a safe descent; but if that be insufficient, all he has to do is to pull down on the cam 8, when the friction may be increased to an extent sufficient to stop himself at any point. In case he wants to lock himself at any given height after stopping himself with the cam 7, all he has to do is to slide down the link 9 to its clamping position. In case it be desirable to let down a child, fainting woman, or otherwise helpless person, all that is necessary is to reverse the attachments, fastening the jaw 1 to the window-sill through the straps 11 and 12, or otherwise, and fastening the person to the unlowered end of the rope after passing it between the jaws; then by the jaw 2 and cam 7 the descent can be regulated from above by the rescuer with perfect ease.

In the modification shown in Fig. 5 an iron rod is substituted for the rope or cable, the gripping-surfaces are extended to a greater length, and the keeper and cam are set at a lower point, thereby greatly increasing the quantity of friction available, and it is designed for a stationary or permanent fire-escape, and is adapted to take down very heavy loads.

It will be readily understood that a basket, cage, or load of any kind may be attached to the unlowered end of the rope and be lowered to the ground in the manner described for rescuing a helpless person.

The straps 11 and 12 can be readily made adjustable to different-sized persons by simply connecting them to the ring 13 through a series of short straps and metallic links.

What I claim, and desire to secure by Letters Patent of the United States, is as follows:

1. In combination, the guide A, the friction-clutch 1 2 3 on said guide, loose locking-link 9, inclosing the jaw arms and provided with the friction-spring 10, bearing against one of said jaws, whereby one of said links is adjustably held on said jaws.

2. In combination, guide A, the friction-clutch 1 2 3, grasping said guide, provided with the keeper 4, cam-lever 7 8, and the loose locking-link 9, provided with the spring 10, as set forth.

3. In combination, guide A, friction-clutch 1 2 3, grasping said guide, the keeper 4, the cam-lever 6 7 8, loose locking-link 9, provided with spring 10, the person-attaching straps 11 and 12, and the links 13 and 14, connecting said straps to said clutch, as and for the purpose set forth.

JOEL CLARK.

In presence of—
JAS. F. WILLIAMSON,
EMMA F. ELMORE.